(12) United States Patent
Morshed et al.

(10) Patent No.: US 12,512,964 B2
(45) Date of Patent: Dec. 30, 2025

(54) MEMORY CONTROLLER CRYPTOGRAPHIC DATA QUANTIZATION USING A CACHE

(71) Applicant: XILINX, INC., San Jose, CA (US)

(72) Inventors: Abbas Morshed, Los Altos, CA (US); Ygal Arbel, Morgan Hill, CA (US)

(73) Assignee: XILINX, INC., San Jose, CA (US)

( * ) Notice: Subject to any disclaimer, the term of this patent is extended or adjusted under 35 U.S.C. 154(b) by 318 days.

(21) Appl. No.: 18/126,877

(22) Filed: Mar. 27, 2023

(65) Prior Publication Data

US 2024/0333473 A1 Oct. 3, 2024

(51) Int. Cl.
*H04L 9/00* (2022.01)
*G06F 12/1009* (2016.01)
*G06F 12/12* (2016.01)
*H04L 9/06* (2006.01)

(52) U.S. Cl.
CPC ........ *H04L 9/0637* (2013.01); *G06F 12/1009* (2013.01); *G06F 12/12* (2013.01); *H04L 9/0631* (2013.01)

(58) Field of Classification Search
CPC . H04L 9/0637; H04L 9/0631; G06F 12/1009; G06F 12/12; G06F 12/0886; G06F 12/123; G06F 2212/1024; G06F 2212/1028; G06F 12/0895; G06F 2212/1052; G06F 12/1408
See application file for complete search history.

(56) References Cited

U.S. PATENT DOCUMENTS

2017/0285976 A1* 10/2017 Durham ................. G06F 21/64

* cited by examiner

*Primary Examiner* — Syed M Ahsan
(74) *Attorney, Agent, or Firm* — Patterson + Sheridan, LLP

(57) ABSTRACT

Some examples described herein provide for an encrypted data quantization apparatus and method, for example a memory controller to quantize encrypted data using a cache. One or more embodiments includes obtaining a first set of plaintext data bits to be stored in a memory device using an encryption scheme. A memory address for encrypted data bits to be stored in the memory device is identified for a first subset of plaintext data bits. A second set of plaintext data bits associated with the memory address is obtained from a cache, if present. The second set of plaintext data bits are modified according to the first set of plaintext data bits to be stored in the memory device to generate a third set of plaintext data bits that are then encoded according to the encryption scheme for storage in the memory device.

19 Claims, 6 Drawing Sheets

MEMORY CONTROLLER CRYPTOGRAPHIC DATA QUANTIZATION USING A CACHE

TECHNICAL FIELD

Examples of the present disclosure generally relate to an encrypted data quantization apparatus and method, for example a memory controller to quantize encrypted data using a cache.

BACKGROUND

Data encryption is the process of converting plain or readable data into a coded form, which can only be accessed or read by authorized users with the appropriate decryption key. Encryption is widely used in computing systems to protect sensitive or confidential information from unauthorized access or interception. In modern computing systems, encryption is used to secure data in storage, data in transit, and data at rest. For example, data communicated within a computing system, including in or between integrated circuits (ICs) or transmitted over a network can be encrypted to protect it from being accessed or intercepted by unauthorized users. Data encryption is an essential tool for protecting sensitive data and ensuring the security of computing systems. Data encryption helps to prevent unauthorized access and protects against data breaches, hacking, and other cyber threats.

Encryption uses complex algorithms and keys to ensure the security of the data. These algorithms scramble the data in a way that only those with the appropriate decryption key can access the original information. The strength of the encryption typically depends on the algorithm used and the length of the key. Common or standardized encryption schemes (algorithms, encoders/decoders) may be implemented by an IC to read from and write to memory storage, whether local to the IC, such as for on-board dynamic random access memory (DRAM), or external to the IC, for example to an external DRAM assembly as the IC or a DRAM chip on a same printed circuit board (PCB) or integration circuitry or assembly as the IC.

Encryption schemes used to access memory typically use a fixed input block size and a fixed output block size, where the output block size is typically the same size as the input block size, but may be fixed but different in some cases. Reads from and writes to memory storage then use the block size associated with the encryption scheme. However, a set of data to be encoded may have a different size than the block size used by the encryption scheme. Where the set of data to be encoded is larger than the block size of the encryption scheme, the set of data may be segmented (chopped, divided) to form smaller block sizes, at least some of which may be the same size as the input block size, and one or more of which may be a different size than the input block size. As such, writing less than the fixed block size requires a read-modify-write operation, where a whole block of data is read from the memory storage device, is modified to include a less than fixed block size of data, then written back to the memory storage device. This read-modify-write operation for less than fixed block size data is inefficient, requiring multiple accesses to the memory storage device. The multiple access may take excess time and power to complete.

SUMMARY

Some examples described herein provide for an encrypted data quantization apparatus and method, for example a memory controller to quantize encrypted data using a cache.

An example of the present disclosure is a method. The method includes obtaining a first set of plaintext data bits to be stored in the memory device. The memory device utilizes an encryption scheme. The method also includes identifying, for a first subset of bits of the first set of plaintext data bits, a memory address for encrypted data bits in the memory device. The method also includes obtaining, from a cache, a second set of plaintext data bits associated with the memory address based at least in part on the second set of plaintext data bits being present in the cache. The method also includes modifying the second set of plaintext data bits according to the first set of plaintext data bits to be stored in the memory device to generate a third set of plaintext data bits associated with the memory address. The method also includes encoding the third set of plaintext data bits according to the encryption scheme to generate a set of encrypted data bits to be stored in the memory device at the memory address.

In an example, an apparatus includes a cache and a cache controller. The cache controller is configured to identify, for a first subset of bits of a first set of plaintext data bits to be stored in a memory device that utilizes an encryption scheme, a memory address for encrypted data bits in a memory device. The cache controller is further configured to direct a cache to provide a second set of plaintext data bits associated with the memory address based at least in part on the second set of plaintext data bits being present in the cache. The cache controller is further configured to modify the second set of plaintext data bits according to the first set of plaintext data bits to be stored in the memory device to generate a third set of plaintext data bits associated with the memory address. The cache controller is further configured to encode the third set of plaintext data bits according to the encryption scheme to generate a set of encrypted data bits. The cache controller is further configured to provide, to the memory device, the set of encrypted data bits to be stored at the memory address.

Another example of the present disclosure is a computing system. The computing system includes a memory device and a integrated circuit coupled with the memory device. The integrated circuit comprises a cache, a cache controller, and an encryption circuit. The cache controller is configured to identify, for a first subset of bits of a first set of plaintext data bits to be stored in a memory device that utilizes an encryption scheme, a memory address for encrypted data bits in the memory device. The cache controller is further configured to direct the cache to provide a second set of plaintext data bits associated with the memory address based at least in part on the second set of plaintext data bits being present in the cache. The encryption circuit is configured to modify the second set of plaintext data bits according to the first set of plaintext data bits to be stored in the memory device to generate a third set of plaintext data bits associated with the memory address. The encryption circuit is further configured to encode the third set of plaintext data bits according to the encryption scheme to generate a set of encrypted data bits. The encryption circuit is further configured to provide, to the memory device, the set of encrypted data bits to be stored at the memory address.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
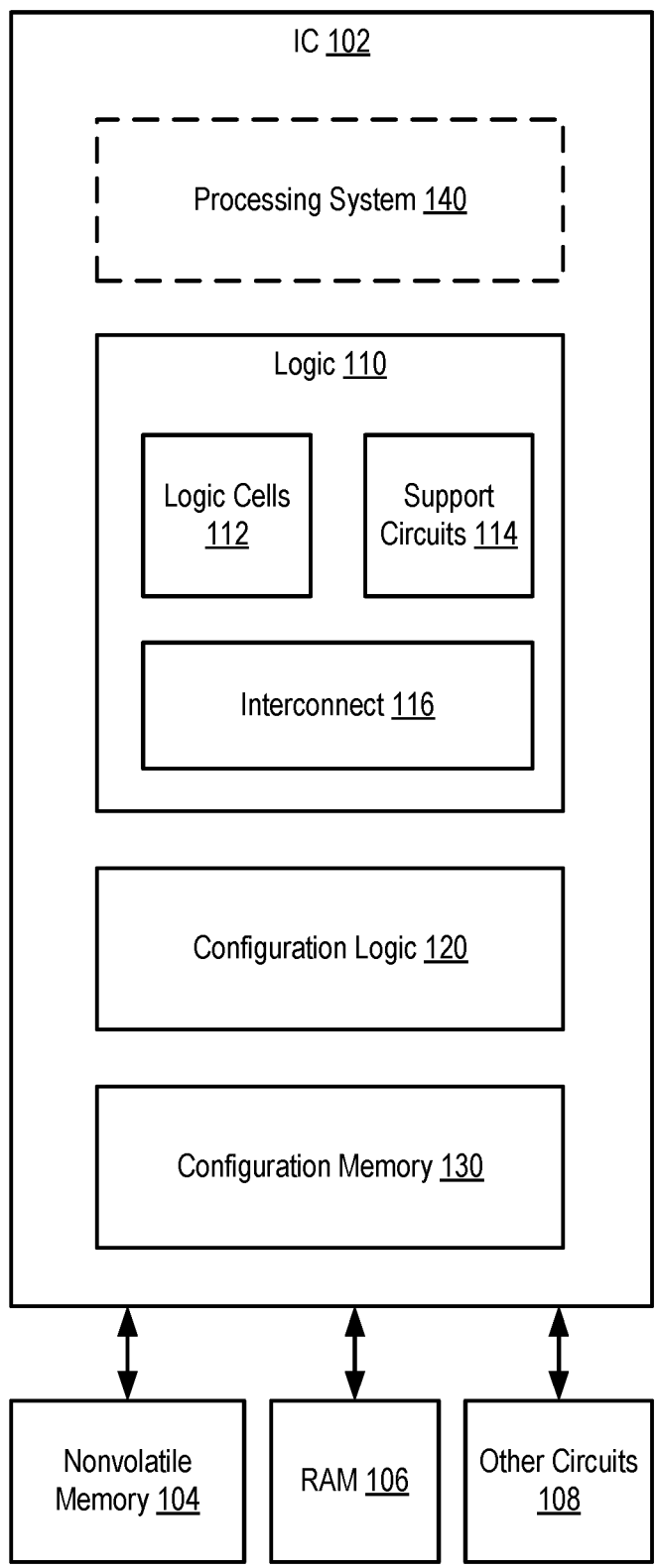
FIG. 1 illustrates a block diagram depicting a computing system that includes a integrated circuit (IC) according to some examples.

Some examples described herein provide for an encrypted data quantization apparatus and method, for example a memory controller to quantize encrypted data using a cache.

Data encryption may be used to protect sensitive data and ensure the security of computing systems. For example, data encryption may be used for memory (memory device, storage, storage unit, memory unit), including in computing systems that include one or more integrated circuits (ICs), which may encrypt data in onboard memory, or connected memory devices. Data encryption helps to prevent unauthorized access and protects against data breaches, hacking, and other cyber threats. For example, an attacker or other malicious interloper may try to intercept data read from or written to memory storage (e.g., random access memory (RAM), such as dynamic random access memory (DRAM)) by an integrated circuit, such as a IC (e.g., a programmable IC, such as a field programmable gate array (FPGA)).

In applications that require encrypting data stored in a memory device, it may be necessary to have a fixed quanta (block size, data unit size) of data to be presented to encryption circuitry used to encrypt or decrypt the data according to an encryption scheme. However, the size of the data associated with a read request or write request are not always divisible to a fixed quanta size used by the encryption circuitry, such that partial data remains in addition to any fixed quanta size of data from the data to be stored. In these cases, circuitry managing the read or write operation (e.g., a memory controller) reads the entire quanta of data from the memory device corresponding to the partial data to be modified (e.g., corresponding to a same memory address), from the storage, then decrypt the entire quanta of data read from the storage unit. Once the data is decrypted the section of the data corresponding to the partial write is modified. The entire quanta of data is then encrypted before being written back to the memory.

In an example, the advanced encryption standard (AES) uses a message size that is fixed to N number of bytes, meaning that every AES cryptographic operation is applied to fixed quanta of data. Accessing larger blocks of data is done by "chopping" (segmenting, dividing) the data into fixed size blocks. There is no direct support for partial block operations by the AES engines. Writing less than the fixed block size required by the AES engine requires a read-modify-write operation. Reading less than this block size is simply done by reading the full block of data and discarding the undesired data.

As further described herein, a cache (a partial-write-cache) can be used to speed up the process of writing to the memory device. One example includes reducing accesses to the storage unit by using a partial-write-cache when write operations require encryption and their size is less than the fixed block size required by the encryption circuitry (e.g., an AES engine). Another example includes providing fixed size data to an AES engine for encryption/decryption when data requested is less than the fixed block size required by the encryption circuitry (e.g., an AES engine).

The writing operation can be sped up by caching the partial writes to the memory device (storage unit) and reducing the number of operations (e.g., to a single read from the storage unit in some examples) followed by a decryption. Techniques described herein may reduce the number of accesses to the storage unit.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

FIG. 1 is a block diagram depicting a computing system 100 that includes a integrated circuit (IC) 102 according to an example. The IC 102 includes logic 110, configuration logic 120, and configuration memory 130. The IC 102 can be coupled to external circuits, such as the nonvolatile memory (NVM) 104, the random access memory (RAM) 106, and other circuits 108. In some examples, RAM 106 may be dynamic random access memory (DRAM).

The logic 110 includes logic cells 112, support circuits 114, and interconnect 116. The logic cells 112 include circuits that can be configured to implement general logic functions of a plurality of inputs. The support circuits 114 include dedicated circuits, such as transceivers, input/output blocks, digital signal processors, memories, and the like. The logic cells 112 and the support circuits 114 can be interconnected using the interconnect 116. Information for programming the logic cells 112, for setting parameters of the support circuits 114, and for programming the interconnect 116 is stored in the configuration memory 130 by the configuration logic 120. The configuration logic 120 can obtain the configuration data from the NVM 104 or any other source (e.g., the RAM 106 or from the other circuits 108).

In one or more embodiments, the support circuits 114 include a memory controller (e.g., a DRAM controller) coupled with and controlling the RAM 106, the NVM 104, or both, including reads from and writes to the RAM 106, the NVM 104, or both. In other embodiments, the processing system 140 includes a memory controller (e.g., a DRAM controller) coupled with and controlling the RAM 106, the NVM 104, or both, including reads and writes. In one or more embodiments, the IC 102 includes a memory controller and the RAM 106, the NVM 104, or both, include a local memory controller. In one or more embodiments, the memory controller of the IC 102 can control one or more aspects of the operation of the RAM 106, the NVM 104, or both, and the local memory controller of the RAM 106, the NVM 104, or both, control one or more aspects of the operation of the RAM 106, the NVM 104, or both. In some embodiments, some aspects of the operation of the local memory controller at the control and direction of the memory controller of the IC 102.

In some examples, the IC 102 is a part of a computing system and is communicatively coupled with a processing system (not shown) of the computing system that is external to the IC 102. The external processing system can include microprocessor(s), memory, support circuits, input/output (I/O) circuits, and the like. In other examples, the processing system 140 can be used in place of at least some of the external processing system for the computing system. The IC 102 can be part of the computing system, and the IC 102 can include the processing system 140 as part of the IC 102, such that the IC 102 includes one or more of the microprocessor(s), memory, support circuits, I/O circuits, and the like. In some example, the entire computing system can be implemented using the IC 102.

In one or more embodiments, IC 102 is a programmable IC. For an embodiment where IC 102 is a programmable IC, logic 110 is programmable logic, or interconnect 116 is programmable interconnect, or both.

Figure 2:
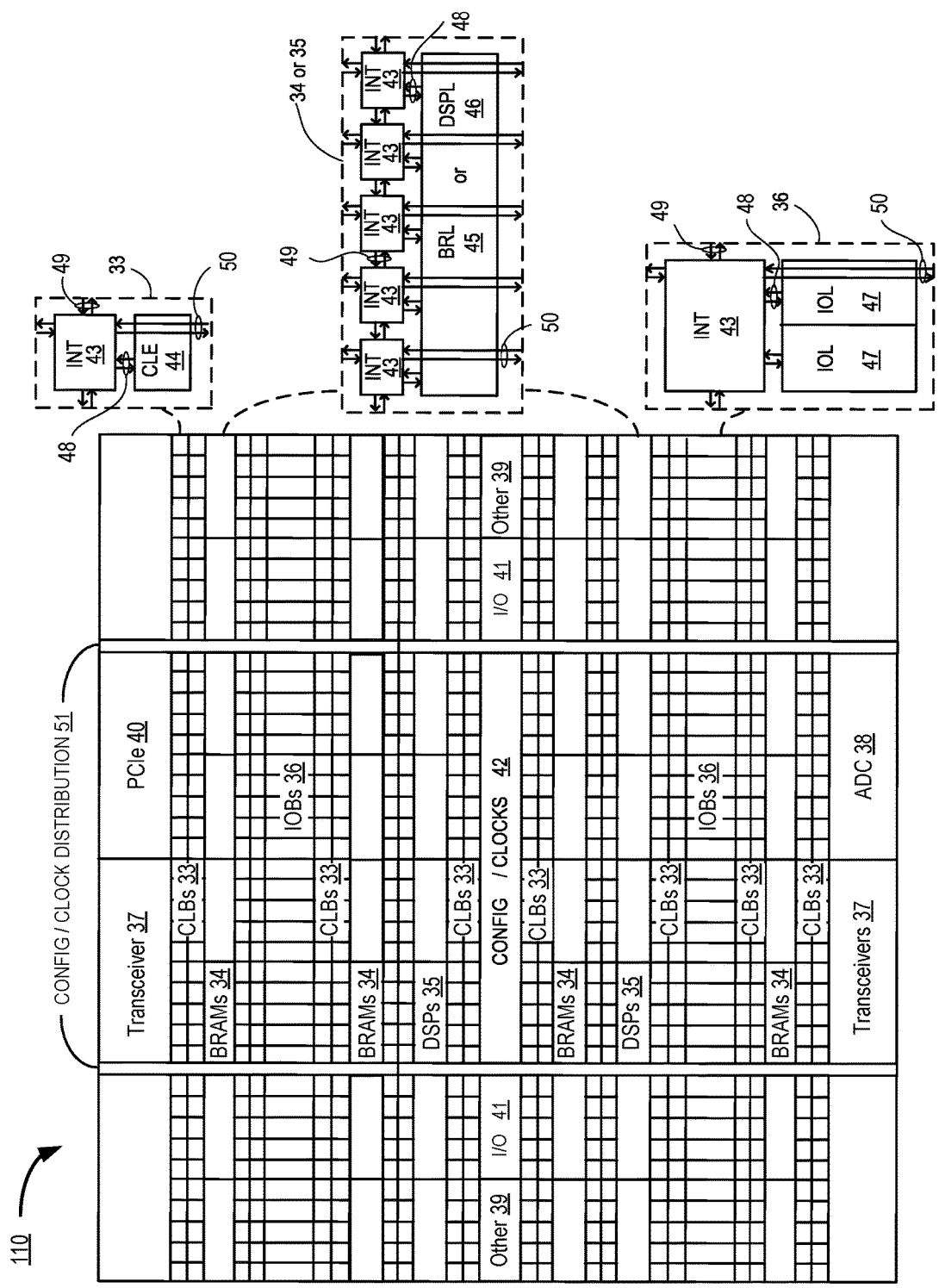
FIG. 2 illustrates a field programmable gate array (FPGA) implementation of the IC according to some examples.

FIG. 2 illustrates a field programmable gate array (FPGA) implementation 200 of the IC 102 according to some examples. In one or more embodiments, FPGA implementation 200 is an example where the IC 102 is a programmable IC. In one or more examples, the IC 102 includes a large number of different programmable tiles including transceivers 37, configurable logic blocks (CLBs) 33, block random access memories (BRAMs) 34, input/output blocks ("IOBs") 36, configuration and clocking logic ("CONFIG/CLOCKS") 42, digital signal processor (DSP) blocks 35, specialized input/output blocks ("I/O") 41 (e.g., configuration ports and clock ports), and other programmable logic 39 such as digital clock managers, analog-to-digital converters, system monitoring logic, and so forth. The FPGA can also include peripheral component interconnect (PCI) express (PCIe) interfaces 40, analog-to-digital converters (ADCs) 38, and the like.

In some FPGAs, each programmable tile can include at least one programmable interconnect element ("INT") 43 having connections to input and output terminals 48 of a programmable logic element within the same tile, as shown by examples included at the top of FIG. 2. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single INT 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP block 35 (which may also be referred to as a DSP tile) can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example of the FPGA implementation 200, a horizontal area near the center of the die is used for configuration, clock, and other control logic. Vertical columns 51 extending from this horizontal area or column are used to distribute the clocks and configuration signals across the breadth of the FPGA implementation 200.

Some examples of FPGAs utilizing the architecture illustrated by the FPGA implementation 200 include additional logic blocks that disrupt the regular columnar structure of the FPGA implementation 200. The additional logic blocks can be programmable blocks and/or dedicated logic.

Note that the FPGA implementation 200 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of the illustrated FPGA implementation 200 are purely exemplary. For example, in an actual implementation of an FPGA, more than one adjacent row of CLBs is typically included where the CLBs appear, to facilitate the efficient implementation of user logic, but the number of adjacent CLB rows can vary with the overall size of the FPGA.

Moreover, the computing system 100 and the FPGA implementation 200 are exemplary systems to implement features and techniques described herein. In other embodiments, systems, apparatuses, and methods disclosed herein can be implemented in other computing systems, devices, and circuits, for example, any IC that uses, requires, or otherwise implements encryption of memory. In one or more embodiments, an IC communicatively coupled with external RAM (e.g., DRAM, DRAM assemblies, SRAM, hard disk, flash memory, or another type of memory device) that is encrypted can implement the techniques disclosed herein.

Figure 3:
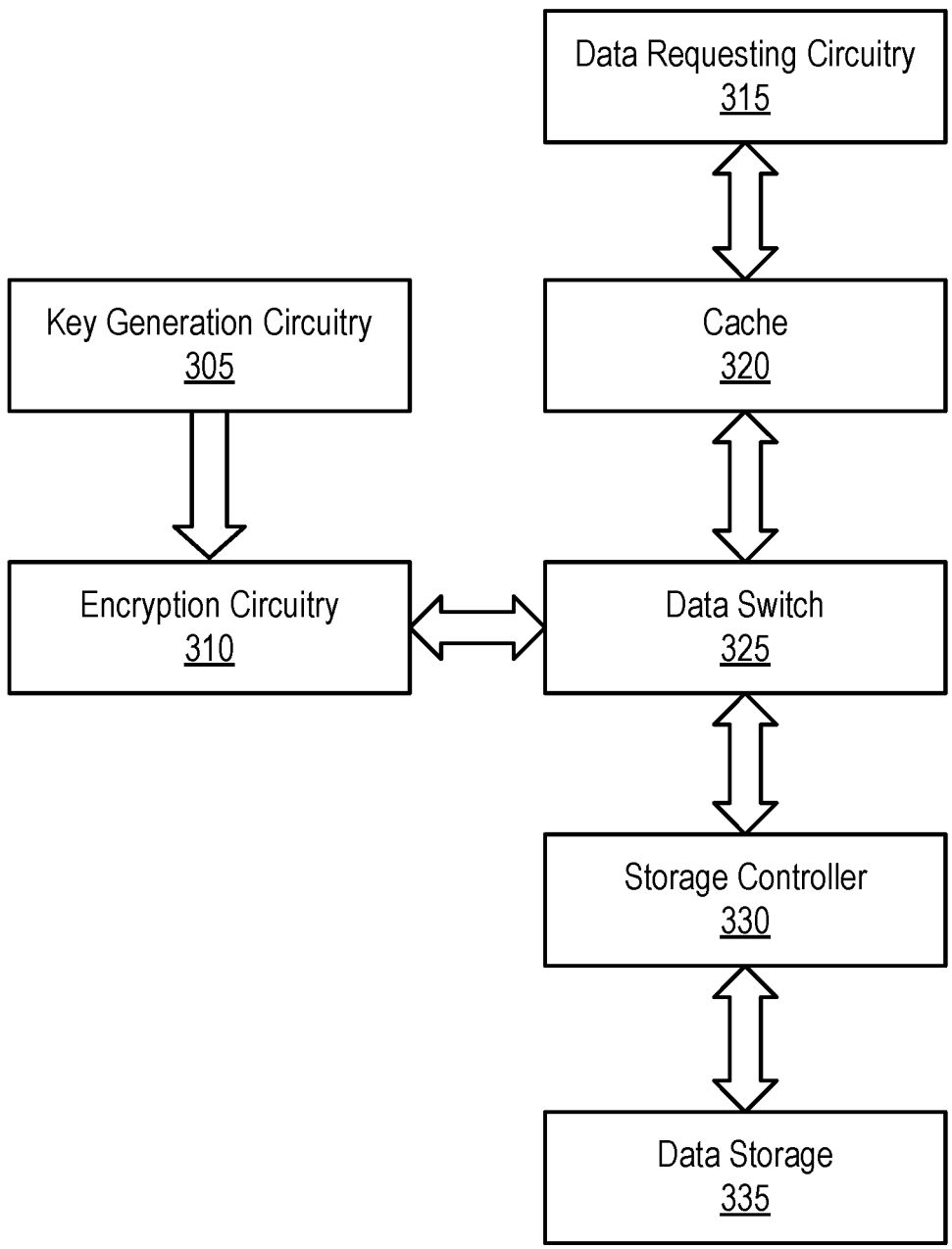
FIG. 3 is a block diagram of aspects of an encrypted data quantization apparatus and method, according to some examples.

FIG. 3 is a block diagram 300 of aspects of an encrypted data quantization apparatus and method, according to some examples. Block diagram 300 includes a key generation circuitry 305, encryption circuitry 310, data requesting circuitry 315, cache 320, data switch 325, storage controller 330, and data storage 335. In some examples, data storage 335 is an example of RAM 106 or NVM 104. In one or more embodiments, one or more of the key generation circuitry 305, encryption circuitry 310, data requesting circuitry 315, cache 320, data switch 325, storage controller 330, or data storage 335 are a portion of support circuits 114 of IC 102.

In some examples, data storage 335 is one or more DRAM or DRAM assemblies, SRAM, a hard disk, flash memory, or another type of memory device. In one or more examples, data storage 335 is part of a same IC as at least one of the key generation circuitry 305, encryption circuitry 310, data requesting circuitry 315, cache 320, data switch 325, or storage controller 330. In other examples, data storage 335 is communicatively coupled with at least the storage controller 330, but part of a different IC from the key generation circuitry 305, encryption circuitry 310, data requesting circuitry 315, cache 320, data switch 325, or storage controller 330. In yet other examples, data storage 335 is located on a same IC or assembly as the storage controller 330, and communicatively coupled with, but part of a different IC from, the key generation circuitry 305, encryption circuitry 310, data requesting circuitry 315, cache 320, data switch 325, or storage controller 330.

Requests from the data requesting circuitry 315 are routed through the cache 320. Cache 320 may also be referred to as a partial-write-cache herein. If the requested write data is less than the quanta size of data supported by the encryption circuitry 310 (e.g., an AES engine), the cache 320 issues a read request to the data storage 335. The returned data from the data storage 335 is then routed to the encryption circuitry 310, via the data switch 325, for decryption by the encryption circuitry 310. The plaintext data is then routed via the data switch 325 to the cache 320. The plaintext write data will reside in (be stored in, written to) the cache 320 (partial-write-cache). The portion of plaintext data, which corresponds to the write request, is updated and will reside in the cache 320.

Read requests that result in a cache hit will have the data returned from the cache 320 (e.g., a partial-write-cache) instead of the memory device (data storage unit), for example where there is an indication from the cache 320 that data associated with a memory location (e.g., a memory address) is to be read from a same memory location as data already existing in the cache 320. Otherwise, the read request is passed to the data storage 335 to retrieve cyphertext data for decryption.

Write requests, including full or partial requests, that result in a cache hit on cache 320 will have their corresponding plaintext data stored in the cache 320.

In one or more embodiments, cache 320 has a fixed size. In one or more embodiments, once all entries in the cache 320 are used (cache 320 is full) a policy is used to evict one or more entries to make room in cache 320 for a new entry. In some examples, the policy is a least-recently accessed policy, where the least-recently accessed entry of cache 320 is evicted. In another example, the policy randomly selects an entry of cache 320 to evict. In some examples, according to the policy an entry of cache 320 is selected at random to evict. In another example, according to the policy the cache 320 is periodically flushed, for example according to a predefined or configured period, or according to a timer that may be set to indicate for how long entries in the cache 320 are considered to be valid. In yet another example, entries in the cache 320 are flushed according to how long ago such entry was entered in the cache (a time of entry).

In one or more embodiments, encryption circuitry 310 implements a symmetric block cipher as the encryption scheme. In some embodiments, the encryption scheme is AES. In some embodiments, the encryption scheme is a Galois/counter mode (GCM) encryption. In some embodiments, the encryption scheme is a xor-encrypt-xor (XEX)-based tweaked-codebook mode with ciphertext stealing (XTS) encryption. In other embodiments, other types of encryptions schemes using a fixed (set, predetermined) plaintext input block size may be used consistent with the disclosure herein.

Figure 4:
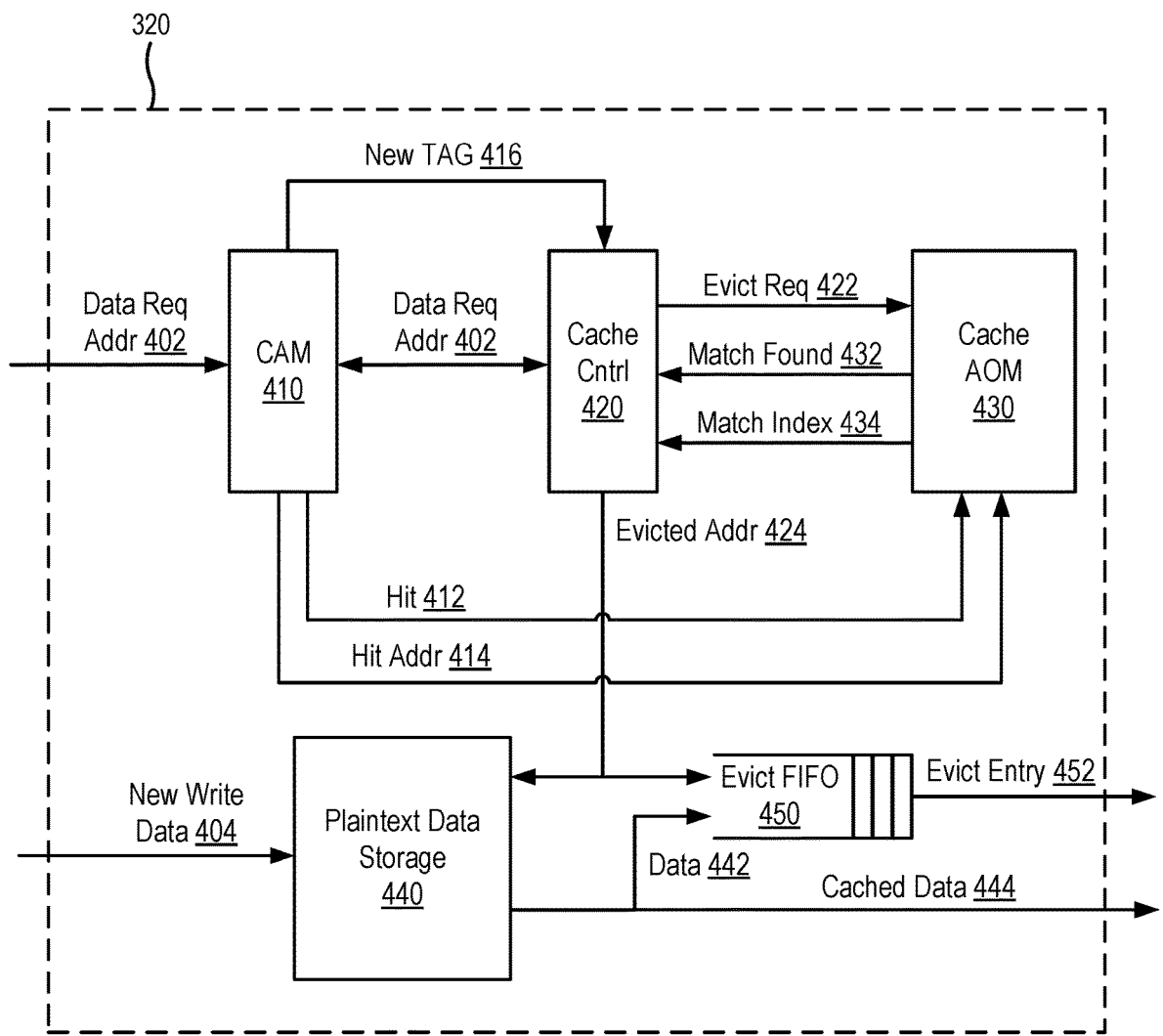
FIG. 4 is a block diagram of aspects of a cache implementation apparatus and method, according to some examples.

FIG. 4 is a block diagram 400 of aspects of a cache implementation apparatus and method, according to some examples. In one or more embodiments, block diagram 400 is an example of a cache 320 described with reference to block diagram 300. Block diagram 400 includes a cache access memory (CAM) 410, cache controller 420, cache age-order matrix (AOM) 430, plaintext data storage 440, and eviction FIFO 450. As used herein, plaintext data storage 440 may also be referred to as just a "cache," for example when reading (retrieving) or writing (storing) plaintext data in the cache 320.

In one or more embodiments, when new write data 404 is received at cache 320, the new write data 404 is initially received at plaintext data storage 440. The data request address 402 associated with a memory location (address) to which the new write data 404 is to be written is received at CAM 410. CAM 410 contains tag memory which stores the address (memory address) of data within the storage unit (memory device). CAM 410 checks whether the data request address 402 matches a stored address in the tag memory of CAM 410. If there is a match (a hit), CAM 410 provides, to cache AOM 430, an indication of a hit 412 and the hit address 414. If there is not a hit, an indication of a new tag 416 is provided to the cache controller 420 along with the data request address 402.

Cache controller 420 selects entries to be evicted, based on an indication received from cache AOM 430, according to an eviction policy. In one or more embodiments, the policy implemented by cache AOM 430 selects a least recently accessed entry within the cache. For example, after receiving the data request address 402, cache controller 420 can identify whether the plaintext data storage 440 is full and, if so, provide an eviction request 422 to cache AOM 430. Cache controller 420 also detects cache-hits or cache-misses based at least in part on a result received from the CAM 410. Cache controller 420 also detects if a write-miss request is eligible for a cache entry based on the write request size being less than the quanta size for the encryption scheme (e.g., less than an AES quanta size).

Cache AOM 430 is used to track entries of the cache to evict according to a policy, for example as further discussed herein. Cache AOM 430 tracks the presence of hits and the corresponding address of the hits based on hit 412 and hit address 414. Based on receiving the eviction request 422, cache AOM 430 identifies an entry of plaintext data storage 440 to be evicted and returns the result to the cache controller 420 via an indication of a match found 432 and an associated index that is match index 434. Cache controller 420 then directs the plaintext data storage 440 to output the entry as data 442 to be evicted to the eviction FIFO 450, where the entry is queued before being output (eviction entry 452 output) to be written (e.g., output to be written by cache controller 420) to storage (the memory device, e.g., data storage 335). Eviction FIFO 450 operates to temporarily store (hold, queue) data evicted from plaintext data storage 440 that is to be stored in the memory device.

Plaintext data storage 440 stores the plaintext data. In one or more examples, plaintext data storage 440 is a static read only memory (SRAM). In the case that data is requested that is found in the plaintext data storage 440 (the data request address 402 is associated with data that is presently stored in the plaintext data storage 440) cache controller 420 directs the plaintext data storage 440 to output the cached data 444, for example to the data requesting circuitry 315.

Figure 5:
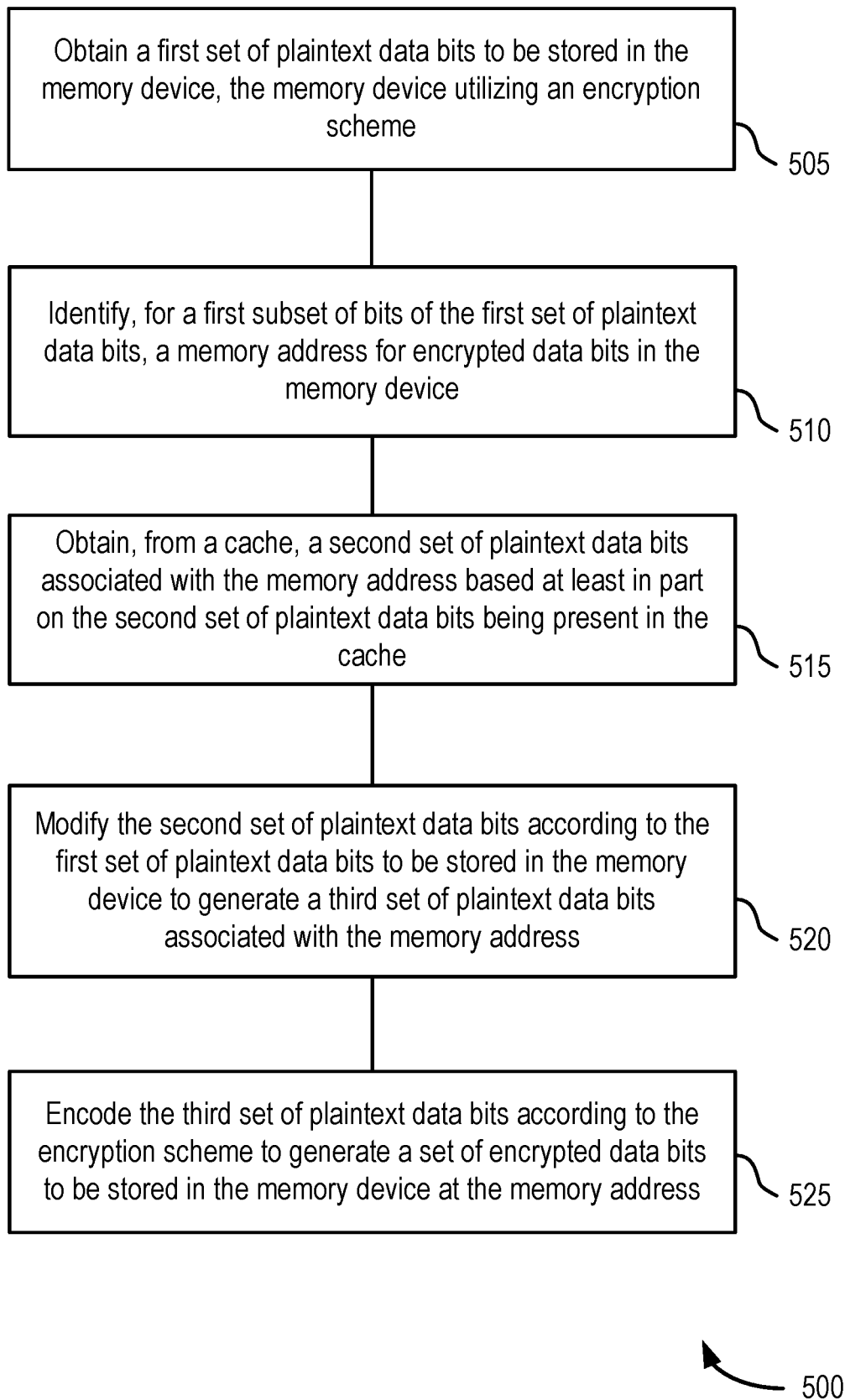
FIG. 5 is a flow diagram of a method for writing to a memory device according to some examples

FIG. 5 is a flow diagram of a method 500 for writing to a memory device according to some examples.

At operation 505, method 500 includes obtaining a first set of plaintext data bits to be stored in the memory device, the memory device utilizing an encryption scheme.

At operation 510, method 500 includes identifying, for a first subset of bits of the first set of plaintext data bits, a memory address for encrypted data bits in the memory device.

At operation 515, method 500 includes obtaining, from a cache, a second set of plaintext data bits associated with the memory address based at least in part on the second set of plaintext data bits being present in the cache.

At operation 520, method 500 includes modifying the second set of plaintext data bits according to the first set of plaintext data bits to be stored in the memory device to generate a third set of plaintext data bits associated with the memory address.

At operation 525, method 500 includes encoding the third set of plaintext data bits according to the encryption scheme to generate a set of encrypted data bits to be stored in the memory device at the memory address.

In one or more embodiments, two or more of operations 505, 510, 515, 520, or 525 are substantially performed concurrently (simultaneously). In some embodiments of method 500, operation 510 is initiated before operation 505 is initiated. In some embodiments, operation 515 is initiated before one or both of operations 505 or 510 are initiated. In some embodiments, operation 520 is initiated before one or more of operations 505, 510, 515, or 520 are initiated.

Figure 6:
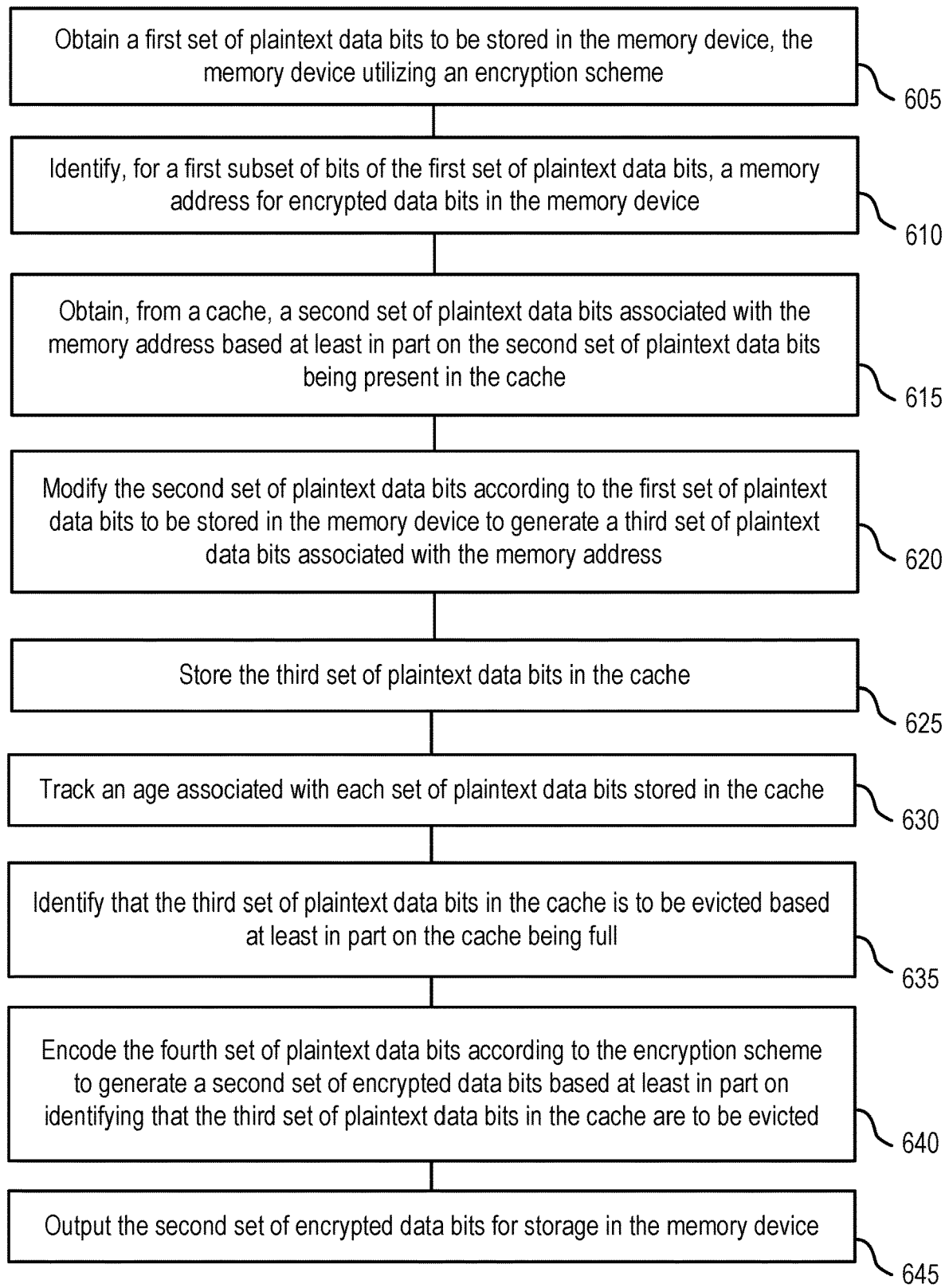
FIG. 6 is a flow diagram of a method for writing to a memory device according to some examples To facilitate understanding, identical reference numerals have been used, where possible, to designate identical elements that are common to the figures. It is contemplated that elements of one example may be beneficially incorporated in other examples.

FIG. 6 is a flow diagram of a method 600 for writing to a memory device according to some examples.

At operation 605, method 600 includes obtaining a first set of plaintext data bits to be stored in the memory device, the memory device utilizing an encryption scheme.

At operation 610, method 600 includes identifying, for a first subset of bits of the first set of plaintext data bits, a memory address for encrypted data bits in the memory device.

At operation 615, method 600 includes obtaining, from a cache, a second set of plaintext data bits associated with the memory address based at least in part on the second set of plaintext data bits being present in the cache.

At operation 620, method 600 includes modifying the second set of plaintext data bits according to the first set of plaintext data bits to be stored in the memory device to generate a third set of plaintext data bits associated with the memory address.

At operation 625, method 600 includes storing the third set of plaintext data bits in the cache.

At operation 630, method 600 includes tracking an age associated with each set of plaintext data bits stored in the cache. In one or more embodiments, the third set of plaintext data bits are identified based at least in part on the age associated with the third set of plaintext data bits as indicated by the tracking.

At operation 635, method 600 includes identifying that the third set of plaintext data bits in the cache is to be evicted based at least in part on the cache being full. In one or more embodiments the third set of plaintext data bits for eviction are further identified based at least in part on the age associated with the third set of plaintext data bits as indicated by the tracking.

At operation 640, method 600 includes encoding the third set of plaintext data bits according to the encryption scheme to generate a set of encrypted data bits.

At operation 645, method 600 includes outputting the set of encrypted data bits for storage in the memory device.

In one or more embodiments, two or more of operations 605, 610, 615, 620, 625, 630, 635, 640, or 645 are substantially performed concurrently (simultaneously). In other embodiments of method 600, two or more of operations 605, 610, 615, 620, 625, 630, 635, 640, or 645 are performed in a different order than indicated. In some embodiments, one or more additional operations may be performed between any two of operations 605, 610, 615, 620, 625, 630, 635, 640, or 645.

In one or more embodiments, one or more operations of method 500 may be combined with one or more operations of method 600.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of writing to a memory device of an integrated circuit (IC), the method comprising:
   obtaining a first set of plaintext data bits to be stored in the memory device, the memory device utilizing an encryption scheme;
   identifying, for a first subset of bits of the first set of plaintext data bits, a memory address for encrypted data bits in the memory device;
   retrieving, from a partial-write cache, a second set of plaintext data bits corresponding to the memory address of the first subset of bits based at least in part on the second set of plaintext data bits being present in the partial-write cache;
   modifying the second set of plaintext data bits stored in the partial-write-cache according to the first set of plaintext data bits to be stored in the memory device to generate a third set of plaintext data bits corresponding to the memory address of the first subset of bits; and
   encrypting, using an encryption circuit, the third set of plaintext data bits according to the encryption scheme to generate a set of encrypted data bits to be stored in the memory device at the memory address, wherein the encryption circuit encrypts the modified second set of plaintext data bits using data from the partial-write cache to avoid a full read-modify-write cycle.

2. The method of claim 1, further comprising:
   checking a cache address memory to determine whether the second set of plaintext data bits associated with the memory address are present in the cache, wherein the second set of plaintext data bits are obtained from the cache based at least in part on an indication obtained from the cache address memory that the second set of plaintext data bits are present in the cache.

3. The method of claim 1, further comprising:
   tracking an age associated with each set of plaintext data bits stored in the cache.

4. The method of claim 1, further comprising:
   storing the third set of plaintext data bits in the cache;
   identifying that the third set of plaintext data bits in the cache is to be evicted based at least in part on the cache being full, wherein the third set of plaintext data bits are encoded according to the encryption scheme to generate the set of encrypted data bits based at least in part on identifying that the third set of plaintext data bits in the cache are to be evicted; and outputting the set of encrypted data bits for storage in the memory device.

5. The method of claim 4, further comprising:
tracking an age associated with each set of plaintext data bits stored in the cache, wherein the third set of plaintext data bits are identified based at least in part on the age associated with the third set of plaintext data bits as indicated by the tracking.

6. The method of claim 4, queueing the third set of plaintext data bits in a first in first out buffer prior to encoding.

7. The method of claim 1, wherein the encryption scheme comprises an advanced encryption standard (AES), a Galois/counter mode (GCM) encryption, or a xor-encrypt-xor (XEX)-based tweaked-codebook mode with ciphertext stealing (XTS) encryption.

8. An apparatus, comprising:
a partial-write cache;
a partial-write cache controller configured to:
identify, for a first subset of bits of a first set of plaintext data bits to be stored in a memory device that utilizes an encryption scheme, a memory address for encrypted data bits in a memory device, and
direct the partial-write cache to provide a second set of plaintext data bits corresponding to the memory address of the first subset of bits based at least in part on the second set of plaintext data bits being present in the partial-write cache; and
an encryption circuit to:
modify the second set of plaintext data bits stored in the partial-write-cache according to the first set of plaintext data bits to be stored in the memory device to generate a third set of plaintext data bits corresponding to the memory address of the first subset of bits,
encrypt the third set of plaintext data bits according to the encryption scheme using data from the partial-write cache to avoid a full read-modify-write cycle to generate a set of encrypted data bits, and
provide, to the memory device, the set of encrypted data bits to be stored at the memory address.

9. The apparatus of claim 8, further comprising:
a cache address memory to store a mapping between memory addresses of the memory device and plaintext data bits stored in the cache, wherein the cache controller is configured to check the cache address memory to determine whether the second set of plaintext data bits associated with the memory address are present in the cache.

10. The apparatus of claim 8, further comprising:
an age tracking matrix to track an age associated with each set of plaintext data bits stored in the cache.

11. The apparatus of claim 8, wherein:
the cache controller is further configured to store the third set of plaintext data bits in the cache and identify that the third set of plaintext data bits in the cache is to be evicted based at least in part on the cache being full, wherein the third set of plaintext data bits are encoded according to the encryption scheme to generate the set of encrypted data bits based at least in part on identifying that the third set of plaintext data bits in the cache are to be evicted; and
the encryption circuit is further configured to output the set of encrypted data bits for storage in the memory device.

12. The apparatus of claim 11, further comprising:
an age tracking matrix to track an age associated with each set of plaintext data bits stored in the cache, wherein the third set of plaintext data bits are identified based at least in part on the age associated with the third set of plaintext data bits as indicated by the tracking.

13. The apparatus of claim 11, further comprising:
a first in first out buffer to queue the third set of plaintext data bits prior to encoding.

14. A computing system, comprising:
a memory device; and
an integrated circuit coupled with the memory device, wherein the integrated circuit comprises a partial-write cache, a partial-write cache controller, and an encryption circuit, wherein:
the partial-write cache controller is configured to identify, for a first subset of bits of a first set of plaintext data bits to be stored in a memory device that utilizes an encryption scheme, a memory address for encrypted data bits in the memory device, and to direct the partial-write cache to provide a second set of plaintext data bits corresponding to the memory address of the first subset of bits based at least in part on the second set of plaintext data bits being present in the partial-write cache; and
the encryption circuit is configured to modify the second set of plaintext data bits stored in the partial-write-cache according to the first set of plaintext data bits to be stored in the memory device to generate a third set of plaintext data bits corresponding to the memory address of the first subset of bits, to encrypt the third set of plaintext data bits according to the encryption scheme using data from the partial-write cache to avoid a full read-modify-write cycle to generate a set of encrypted data bits, and to provide, to the memory device, the set of encrypted data bits to be stored at the memory address.

15. The computing system of claim 14, wherein the integrated circuit further comprises:
a cache address memory to store a mapping between memory addresses of the memory device and plaintext data bits stored in the cache, wherein the cache controller is configured to check the cache address memory to determine whether the second set of plaintext data bits associated with the memory address are present in the cache.

16. The computing system of claim 14, wherein the integrated circuit further comprises:
an age tracking matrix to track an age associated with each set of plaintext data bits stored in the cache.

17. The computing system of claim 14, wherein:
the cache controller is further configured to store the third set of plaintext data bits in the cache and identify that the third set of plaintext data bits in the cache is to be evicted based at least in part on the cache being full, wherein the third set of plaintext data bits are encoded according to the encryption scheme to generate the set of encrypted data bits based at least in part on identifying that the third set of plaintext data bits in the cache are to be evicted; and
the encryption circuit is further configured to output the set of encrypted data bits for storage in the memory device.

18. The computing system of claim 17, wherein the integrated circuit further comprises:
  an age tracking matrix to track an age associated with each set of plaintext data bits stored in the cache, wherein the third set of plaintext data bits are identified based at least in part on the age associated with the third set of plaintext data bits as indicated by the tracking.

19. The computing system of claim 17, wherein the integrated circuit further comprises:
  a first in first out buffer to queue the third set of plaintext data bits prior to encoding.

\* \* \* \* \*